United States Patent [19]

Mitchell et al.

[11] Patent Number: 5,460,771

[45] Date of Patent: Oct. 24, 1995

[54] PROCESS FOR PRODUCING CORRUGATED MULTI-LAYER TUBING HAVING LAYERS OF DIFFERING PLASTIC CHARACTERISTICS

[75] Inventors: Frank L. Mitchell, Rochester, Mich.; David L. Noone, Marsberg, Germany

[73] Assignee: ITT Corporation, New York, N.Y.

[21] Appl. No.: 192,503

[22] Filed: Feb. 7, 1994

Related U.S. Application Data

[63] Continuation-in-part of Ser. No. 962,300, Oct. 16, 1992, Pat. No. 5,284,184, and a continuation-in-part of Ser. No. 962,496, Oct. 16, 1992, abandoned.

[51] Int. Cl.$^6$ ............................ B29C 33/42; B29C 47/06; B29C 53/30

[52] U.S. Cl. .............. 264/508; 264/514; 264/566; 264/571; 264/572; 264/151; 264/166; 264/167; 264/209.5; 264/210.2; 264/171.27; 425/133.1; 425/326.1; 425/396

[58] Field of Search ........................... 264/508, 514, 264/566, 568, 571, 572, 151, 166, 167, 173, 209.5, 210.2, 286; 425/396, 393, 326.1, 133.1

[56] References Cited

U.S. PATENT DOCUMENTS

| | | |
|---|---|---|
| 3,070,132 | 12/1962 | Sheridan . |
| 3,473,087 | 10/1969 | Seade . |
| 3,561,493 | 2/1971 | Maillard et al. . |
| 3,577,935 | 5/1971 | Reinhart et al. ............ 425/326.1 |
| 3,692,889 | 9/1972 | Hetrich ............................ 264/566 |
| 3,828,112 | 8/1974 | Johansen et al. . |
| 3,907,955 | 9/1975 | Viennst . |
| 4,059,847 | 11/1977 | Phillips et al. . |
| 4,136,143 | 1/1979 | Lupke et al. ..................... 264/508 |
| 4,272,585 | 6/1981 | Strassel . |
| 4,273,798 | 6/1981 | Scheiker . |
| 4,303,457 | 12/1981 | Johansen et al. . |
| 4,330,017 | 5/1982 | Patch et al. . |
| 4,448,748 | 5/1984 | Radtke et al. . |
| 4,675,780 | 6/1987 | Barnes et al. . |
| 4,685,090 | 8/1987 | Krevor . |
| 4,710,337 | 12/1987 | Nordstrom ....................... 264/566 |
| 4,853,297 | 8/1989 | Takahashi et al. . |

(List continued on next page.)

FOREIGN PATENT DOCUMENTS

| | | |
|---|---|---|
| 0551094 | 7/1993 | European Pat. Off. . |
| 2114550 | 6/1972 | France . |
| 2577564 | 8/1986 | France . |
| 2577168 | 8/1986 | France . |
| 1779905 | 2/1972 | Germany . |
| 4001125 | 8/1986 | Germany . |
| 3821723 | 9/1989 | Germany . |
| 9001467 | 4/1990 | Germany . |
| 4001126 | 12/1990 | Germany . |
| 3942354 | 6/1991 | Germany . |
| 4006870 | 7/1991 | Germany . |
| 9007303 | 12/1991 | Germany . |
| 9400522 | 1/1994 | Germany . |
| 46-9667 | 3/1971 | Japan ........................ 264/508 |
| 55-97933 | 7/1980 | Japan ........................ 264/568 |
| 60-32627 | 2/1985 | Japan ........................ 264/508 |
| 2204376 | 11/1988 | United Kingdom . |

Primary Examiner—Mathieu D. Vargot
Attorney, Agent, or Firm—Robert P. Seitter; J. Gordon Lewis

[57] ABSTRACT

A method for producing polymeric tubing which is resistant to permeation by organic material contained therein which has at least one region defined by a plurality of outwardly extending annular ridges. In this method, tubular polymeric material having a first outer diameter and composed of at least three overlying polymeric layers is introduced into a mold device upon exit of the tubular polymeric material from a suitable extrusion device, the surface of the mold device having at least one region defined by an annular depression in an essentially cylindrical surface. Once the tubular material is introduced, it is expanded to a second outer diameter such that the tubular material deformably contacts the mold surface. The corrugated tubular material then exits from the die device after completion of the expansion step.

22 Claims, 5 Drawing Sheets

U.S. PATENT DOCUMENTS

| | | |
|---|---|---|
| 4,880,036 | 11/1989 | Kitami et al. . |
| 4,887,647 | 12/1989 | Igarashi et al. . |
| 4,984,604 | 1/1991 | Nishimura . |
| 4,990,383 | 2/1991 | Bergström et al. . |
| 5,019,309 | 5/1991 | Brunnhofer . |
| 5,038,833 | 8/1991 | Brunnhofer . |
| 5,076,329 | 12/1991 | Brunnhofer . |
| 5,112,692 | 5/1992 | Strassee et al. . |
| 5,141,427 | 8/1992 | Hegler et al. ............................ 425/396 |
| 5,142,782 | 9/1992 | Martucci . |
| 5,143,122 | 9/1992 | Adkins . |
| 5,167,259 | 12/1992 | Brunnhofer . |
| 5,170,011 | 12/1992 | Martucci . |
| 5,219,003 | 6/1993 | Kerschbaumer . |
| 5,284,184 | 2/1994 | Noone et al. . |

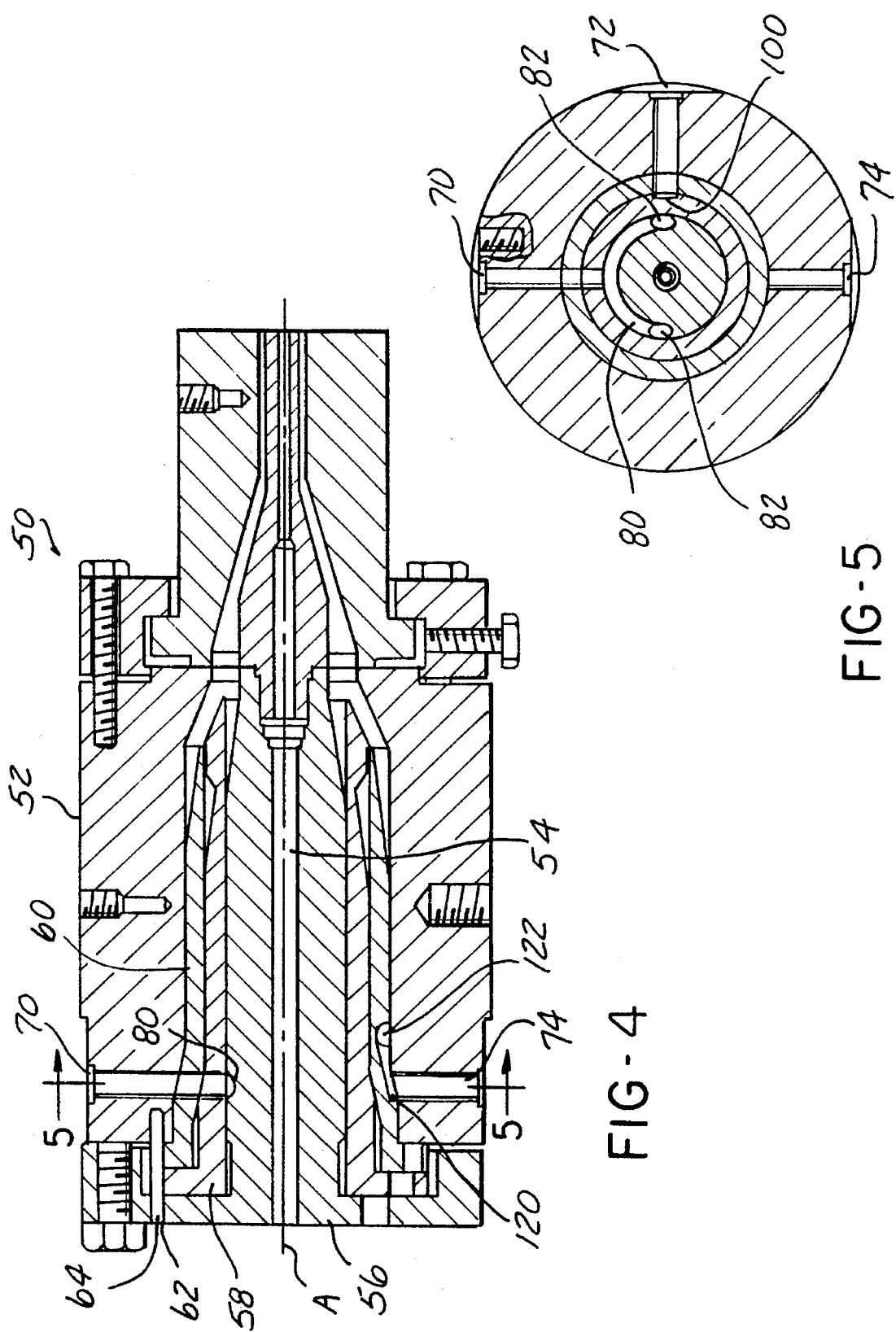

PROCESS FOR PRODUCING CORRUGATED MULTI-LAYER TUBING HAVING LAYERS OF DIFFERING PLASTIC CHARACTERISTICS

CROSS REFERENCE TO RELATED APPLICATIONS

This application is a continuation-in-part of Ser. Nos. 07/962,300 and 07/962,496 both filed Oct. 16, 1992 in the United States Patent Office, the former now U.S. Pat No. 5,284,184 and the latter now abandoned.

FIELD OF THE INVENTION

The present invention relates to a process for producing multi-layer thermoplastic tubing having at least one region of corrugation. Such tubing is suitable for use as hose material in a motor vehicle. The tubing produced by the process of the present invention is of narrow gauge and small diameter.

BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 $g/m^2$ per 24 hour period would be required.

Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11, and Nylon 12.

Alcohol and aromatic compounds in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer non-corrugated fuel line is proposed which is composed of a thick corrosion-resistant outer layer formed of a material known to be durable and resistant to environmental degradation such as Nylon 11 or Nylon 12. The tubing disclosed in this reference also includes a thick intermediate layer composed of conventional Nylon 6. The outer and intermediate layers are bonded together by a thin intermediate bonding layer composed of a polyethylene or a polypropylene having active side chains of maleic acid anhydride. A thin inner layer of aftercondensed Nylon 6 with a low monomer content is employed as the innermost region of the tubing. The use of Nylon 6 as the material in the inner fluid contacting surface is designed to eliminate at least a portion of the monomer and oligomer dissolution which would occur with Nylon 11 or Nylon 12. The thin innermost layer is bonded to the thick intermediate layer by a solvent blocking layer formed of a copolymer of ethylene and vinyl alcohol with an ethylene content between about 30% and about 45% by weight. The use of a five layer system was mandated in order to obtain a tubing with the impact resistance of Nylon 12 and the low monomer/oligomer dissolution of Nylon 6. It was felt that these characteristics could not be obtained in a tubing of less than five layers.

In U.S. Pat. No. 5,038,833 also to Brunnhofer, a three-layer non-corrugated fuel line without the resistance to monomer/oligomer dissolution is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides, preferably modified or unmodified Nylon 6. The outer layer is composed of either Nylon 6 or Nylon 12.

Another non-corrugated tubing designed to be resistant to alcoholic media is disclosed in UK Application Number 2 204 376 A in which a tube is produced which has an thick outer layer composed of 11 or 12 block polyamides such as Nylon 11 or Nylon 12 which may be used alone or combined with 6 carbon block polyamides such as Nylon 6 or 6.6 Nylon. The outer layer may be co-extruded with an inner layer made from alcohol-resistant polyolefin co-polymer such as a co-polymer of propylene and maleic acid.

Heretofore it has been extremely difficult to obtain satisfactory lamination characteristics between dissimilar polymer layers. Thus all of the multi-layer tubing proposed previously has employed polyamide-based materials in most or all of the multiple layers. While many more effective solvent-resistant chemicals exists, their use in this area is limited due to limited elongation properties, strength and compatibility with materials such as Nylon 11 and 12.

It has also been difficult to obtain a multi-layer tubing which is capable of bending or being bent to conform to the contours in the particular automotive vehicle. In most automotive applications, the tubing employed must be capable of bending to a variety of angles both obtuse and acute to conform to the layout and the space requirements in the specific vehicle design. Materials such as conventional Nylons possess a significant elastic memory which makes it difficult to successfully bend a piece of tubing into the shape or contours necessary in the particular automotive application. Conventional non-corrugated tubing when bent will experience significant reduction in its useful life due to fatigue and stress at or near the contour sight.

In order to obviate this problem, it has been proposed that the tubing be corrugated at the appropriate contour regions to accommodate the particular bends and angles without imparting under fatigue or stress. The contour region may include a plurality of annularly oriented accordion-like pleats which permit one longitudinal side of the pleats to be compressed in on themselves while the opposing longitudinal side of the annular pleats can be extended outwardly from one another to accommodate the necessary bend.

In the past, single layer corrugated tubing has been produced. To produce tubing with suitable regions of corrugation or other suitable annular contours, a suitable polymeric monofilament is extruded from a suitable extrusion head preferably in a semi-molten state. The material is, then, introduced into a suitable die means where it is forced to conform with the contours of the interior surface of the die. The semi-molten material is allowed to completely solidify thereby producing tubing material with the suitable corrugated ridges.

This process is reasonably successful for producing single-layer polymeric tubing materials having wall thicknesses between about 0.75 mm and about 2.0 mm. Materials such as Nylon 11 and Nylon 12 have inherent characteristics which permit these materials to stretch to conform to the ridges and contours present in the molding dies upon extrusion without compromising the integrity of the tubing wall. However, when wall thicknesses of materials such as Nylon 11 and Nylon 12 are decreased below this level, the elastic expansion capacity of the extruded polymeric material is exceeded. This results in non-homogeneous wall thickness in the corrugation regions. Thus, current methods for producing corrugated tubing are limited to the production of single-layer tube having a wall thickness above 0.75 mm.

Additional problems are presented when the tubing material employed is made of layers of differing chemical compositions. Different polymeric materials exhibit different degrees of elasticity, stretch and the like. When multiple layer tubing is expanded to conform to the contours of the inner surface of the molding die, the differing expansion characteristics can cause the various layers to delaminate, destroying the advantages sought by the use of multi-layer tubing. Additionally, in order to obtain a suitable total wall thickness, each of the various layers extruded in a multi-layer tube can have thicknesses which approach or are below the thickness necessary to accommodate stretch due to deformation. The post-extrusion molding process can result in localized areas within the corrugated region of the tubing in which the integrity of the various layers is severely compromised. It is possible that localized areas within the corrugation would be characterized by a complete absence of one of the layers due to this unequal deformation.

It would be highly desirable from the standpoint of economics and ease of manufacturing to provide a method by which corrugated multi-layer tubing could be produced as part of a coextrusion process in a continuous manner.

It would also be desirable to provide a multi-layer tubing material which could be employed in motor vehicles which would be durable and prevent or reduce permeation of organic materials therethrough. It would also be desirable to provide a tubing material which would be essentially non-reactive with components of the liquid being conveyed therein. It would also be desirable to provide a multi-layer tubing material which exhibits these characteristics which has localized or overall areas of corrugation.

SUMMARY OF THE INVENTION

The present invention is a method for producing polymeric tubing which is resistant to permeation by organic material contained therein which has at least one region defined by at least one corrugated region. The method of the present invention comprises the steps of:

introducing tubular polymeric material having a first outer diameter which is composed of at least three concentric polymeric layers composed of thermoplastic material, at least two of which are thermoplastics having differing chemical compositions into a mold device upon exit of the tubular polymeric material from a suitable extrusion device, the mold device comprising means for continuously forming the tubular material introduced therein, the mold device having a cylindrical mold surface having an inner diameter greater than the first outer diameter of the tubular polymeric tubing;

expanding the tubular material to a second diameter such that the outer surface of the tubular material deformably contacts the cylindrical mold surface; and permitting said tubular material to exit from said mold device after the expansion step.

The mold means into which the tubular polymeric material is introduced includes a plurality of segmented dies with each die having a first end, a second end, and a shaft defining an essentially cylindrical mold surface which extends from the first end to the second end of the die. At least one of the segmented dies has at least one annular depression located in the cylindrical inner surface to accommodate the formation of at least one region of convolution in the extruded tubing. The dies are sequentially positioned in an end-to-end fashion so as to travel longitudinally away from the extrusion device at a uniform rate of travel.

DESCRIPTION OF THE DRAWING

The objects, features and advantages of the present invention will become more readily apparent from the following description, reference being made to the following drawing in which:

FIG. 4 is a schematic diagram representing an extrusion head suitable for use in the process of the present invention;

FIG. 5 is a cross sectional view taken along the 5—5 line of FIG. 4;

FIG. 141 is a cross sectional view taken along the 14—14 line of FIG. 11;

DESCRIPTION OF THE PREFERRED EMBODIMENT

Figure 1:
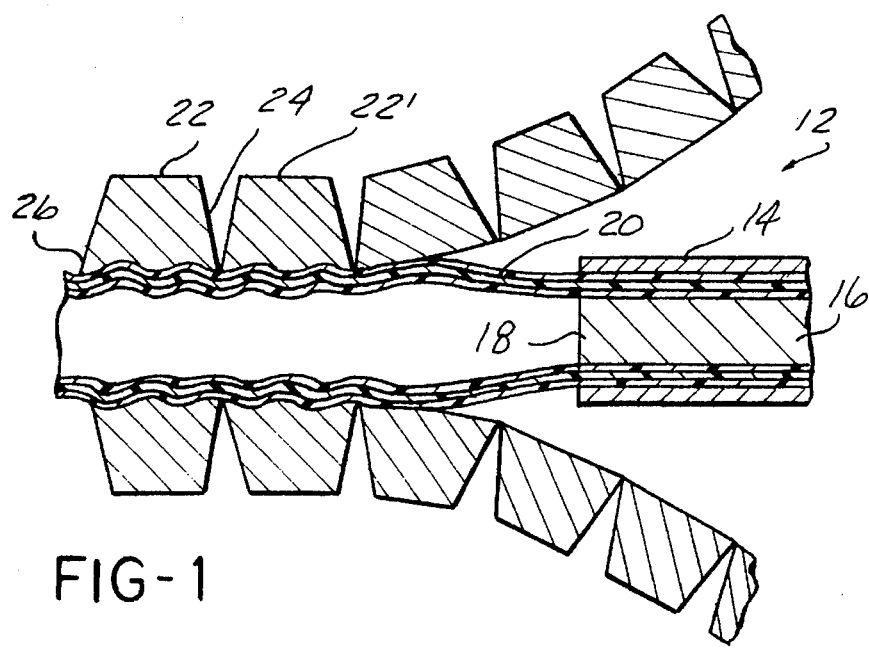
FIG. 1 is a schematic depiction of the extrusion outlet and die track of the present invention with the extrusion outlet die track and extruded material shown in cross section.

The present invention is a process for producing multi-layer tubing which can accommodate bending, flexing or twisting and has at least one region of corrugation located in its length in a continuous manner. The multi-layer tubing with localized corrugated regions produced by the process of the present invention generally has an exterior layer composed of an extrudable melt processible thermoplastic; an intermediate bonding layer bonded to the inner face of the outer layer which consists essentially of an extrudable melt-processible thermoplastic material capable of forming sufficiently permanent laminar adhesion to the inner face of the outer tubing material; and an inner layer bonded to the intermediate bonding layer, the inner layer consisting of material exhibiting sufficiently permanent laminar adhesion with the intermediate bonding layer. The inner layer is composed of a thermoplastic material which is resistant to permeation by or interaction with chemical compounds found in fuel particularly to aromatic and aliphatic hydrocarbons and alcohols. The inner layer may, if desired, possess the capacity for dissipating energy in a range between about $10^{-4}$ ohm/cm$^2$ to about $10^{-9}$ ohm/cm$^2$. In instances where the thermoplastic employed in the inner layer is chemically dissimilar to the material employed in the exterior layer, the thermoplastic material is selected from the group consisting of polyvinylidine fluoride, polyvinyl fluoride and ethylene tetrafluoroethylene copolymers. In instances where the inner layer is of materials which are defined as being chemically similar to those employed in the outer layer. The thermoplastic material is a polyamide selected from the group consisting of Nylon 12, Nylon 11 and Nylon 6.

The materials which comprise the various layers of tubing are coextruded in a manner such that the layers are laminated to one another upon exit from the coextrusion device and are generally resistant to delamination during and after post extrusion molding and/or corrugating processes and throughout the subsequent lifetime of the tubing. Tubing formed by the process of the present invention can be produced to meet various specifications. Automotive tubing formed by the process of the present invention will, preferably, have an overall tensile strength of no less than 25N/mm$^2$ and an elongation value in non-corrugated regions of at least 150%.

The exterior layer of the tubing formed by the process of the present invention, preferably, contacts the surrounding environment exterior to the tubing. The thermoplastic employed in the exterior layer is, preferably, a material which is non-reactive with the external environment and can withstand various shocks, vibrational fatigue, and changes in temperature as well as exposure to various corrosive or degradative compounds to which it would be exposed through the normal course of service operation. In automotive applications, it is anticipated that the thermoplastic employed in the exterior layer would enable the resulting multi-layer tubing to be suitable for use at an outer service temperature range between about $-40°$ C. and about $150°$ C., with a range of $-20°$ C. to $120°$ C. being preferred.

In general, the exterior layer is composed of a thermoplastic material selected from the group consisting of twelve-carbon block polyamides (Nylon 12), eleven-carbon block polyamides (Nylon 11), zinc chloride resistant six-carbon block polyamides (Nylon 6), and mixtures thereof. It is to be understood that other various thermoplastic materials can be employed in producing corrugated multi-layer tubing by the process of the present invention. Suitable materials would be capable of coextrusion with at least one chemically dissimilar thermoplastic material layer to form a bond between the two respective layers which is sufficiently uniform and homogeneous in a melted state to result in permanent adhesion between the layers upon cool down and solidification so as to resist delamination when tested using methods defined in other thermoplastic materials which could be employed will generally exhibit extrusion and post-extrusion characteristics similar to the polyamides. Examples of other materials which can be employed in the process of the present invention as the exterior layer include materials such as polyester materials, bromoisobutene-isoprene materials, polybutadiene, chlorinated butyl rubber, chlorinated polyethylene, polychloromethyloxirane, chloroprene, chlorosulphonyl-polyethylene, ethylene oxide and chloromethyloxirane polymers. Suitable polymeric materials can also include ethylenepropylenediene terpolymers, ethylenepropylene co-polymers, polyether urethanes, isoprene, isobutene-isoprene, nitrylbutadiene, polyvinylchloride, styrene-butadiene, polysulfides, polyolefins, polyphenylsulfides.

In the preferred embodiment, a polyamide such as zinc chloride-resistant Nylon 6, Nylon 11, or Nylon 12 is employed. Such materials can contain various plasticizers, proprietary additives and the like as would be readily known in the art. Such materials are integrated into the polyamide material as supplied by the commercial supplier. Where plasticizers are integrated into the polyamide material to be co-extruded as the outer layer, polyamides such as Nylon 12 may contain up to 17% by composition weight plasticizer; with amounts between about 1% and about 13% being preferred. Polyamides such as zinc chloride-resistant Nylon 6 may contain modifying agents such as various plasticizing agents which would generally be present in amounts between about 1.0% and about 13% by total weight of the thermoplastic composition.

Nylon 12 is a standard article of commerce and is available from a variety of sources for producing multi-layer corrugated tubing such as for automotive applications. The Nylon 12 thermoplastic material can include appropriate additives and modifiers to provide a finished tubing capable of withstanding impacts of at least 2 foot pounds at −20° C. as defined by the test method promulgated in SAE J844 (revised June 1990) paragraph 9.11. Such material is referred to as impact resistant modified Nylon 12. Examples of such materials include GRILAMIDE XE3148 an impact resistance modified Nylon 12 commercially available from EMS-Chemie AG of Zurich, Switzerland, Hüls 2124 commercially available from Hüls gMBH, in Hüls, Germany, and UBE 3030 and UBE 3030 JIX 31 available from UBE Industries.

The zinc chloride-resistant Nylon 6 is a material capable of withstanding impacts of at least 2 foot pounds at −20° C. as defined by test method J844. Where 6-carbon block polyamide materials are employed in the inner layer, these materials may contain various plasticizers, fire retardants and the like as well as sufficient quantities of modifying agents to impart a level of zinc chloride resistance greater than or equal to that required by test method SAE J844: i.e. non-reactivity after 200 hour immersion in a 50 by weight aqueous zinc chloride solution. When employed, the 6-carbon block polyamide material is a multi-component system comprised of a Nylon-6 copolymer blended with other Nylons and olefinic compounds. The 6-carbon block polyamide material of choice will preferably be resistant to zinc chloride and have a processing temperature between about 430° F. and 530° F. Such materials are preferably, impact-modified material and are capable of withstanding impacts of at least 2 foot pounds at temperatures below about −20° C. when formed as tubing. Examples of thermoplastic materials containing Nylon 6 suitable for use in the tubing process of the present invention are propriety materials which can be obtained commercially under the tradenames M-7551 from NYCOA Corporation and ALLIED 1779 from Allied Chemical. These materials have characteristics defined by the respective manufacturer such as those set forth in Table I.

In the method of the present invention, the thermoplastic material of the exterior layer is continuously extruded from a suitable coextrusion head at a wall thickness sufficient to accommodate localized expansion and elongation in molded, contoured, and corrugated regions. The contoured or corrugated regions may evidence or experience a degree of localized stretching or thinning but will be of sufficient initial thickness to withstand the stretching without compromising the integrity of the multi-layer wall structure. In the preferred embodiment, the exterior layer is extruded to an initial wall thickness between about 0.2 mm and about 1.5 mm; with a preferred thickness between about 0.6 mm and about 1.5 mm and a thickness between about 0.6 to about 1.0 mm being most preferred.

In the method of the present invention, a suitable inner layer is coextruded with the exterior layer and has an outwardly oriented face bonded to the inner surface of an intermediate layer interposed between the respective inner and outer layers which will be discussed in detail subsequently. The inner layer has an inwardly oriented face which is opposed to and essentially parallel to the outwardly oriented face. The inwardly oriented face is positioned to be in contact with organic material such as fuel conveyed through the multi-layer tubing produced by the process of the present invention. The inner layer is composed of a permeation resistant, chemically resistant thermoplastic material. The material of choice may be either a material which is chemically dissimilar to the material employed in the exterior layer or a material which is similar thereto.

Suitable "chemically similar" materials include thermoplastic materials defined previously in connection with the exterior layer with the preferred thermoplastic material being a polyamide selected from the group consisting of 12 carbon block polyamides (Nylon 12), 11-carbon block polyamides (Nylon 11) as well as zinc chloride-resistant 6-carbon block polyamides (Nylon 6). Thus, the thermoplastic polyamide material employed in the inner layer of the tubing of the present invention either may be identical to the material employed in the thick outer layer or may be a different thermoplastic polyamide selected from those listed.

The thermoplastic polyamide employed in the inner layer may be either modified or unmodified. If modified, it is anticipated that the material will contain various plasticizers as are readily known in the art. In the preferred embodiment, where polyamides such as Nylon 6 or Nylon 12 are employed, such materials, preferably, will contain up to 17% by composition weight plasticizer; with amounts between about 1% and about 13% being preferred.

Where 6-carbon block polyamide materials are employed in the inner layer, these materials may contain various plasticizers, fire retardants and the like as well as sufficient quantities of modifying agents to impart a level of zinc chloride resistance greater than or equal to that required by test method SAE J844: i.e. non-reactivity after 200 hour immersion in a 50% by weight aqueous zinc chloride solution. When employed, the 6-carbon block polyamide material is a multi-component system comprised of a Nylon-6 copolymer blended with other Nylons and olefinic compounds. The 6-carbon block polyamide material employed in the inner layer may be resistant to zinc chloride and, preferably, will be an impact-modified material capable of withstanding impacts of at least 2 foot pounds at temperatures below about −20° C. Examples of thermoplastic materials suitable for use in the tubing of the present invention are proprietary materials which can be obtained commercially under the tradenames M-7551 from NYCOA Corporation and ALLIED 1779 from Allied Chemical previously defined in Table I.

The term "chemically dissimilar" is used herein to define materials which are capable of adhesion either to an intermediate bonding layer interposed between the inner and exterior layers or, alternately, directly to the inner surface of the exterior layer. In the preferred embodiment the chemically dissimilar material employed is a non-polyamide thermoplastic. Preferably, the material is a fluorinated thermoplastic selected from the group consisting of polyvinylidine fluoride, polyvinyl fluoride, polychlorotrifluoroethylene, and ethylene tetrafluoroethylene copolymers. Examples of other fluoroplastic materials which can be employed in the inner layer of the multi-layer tubing of the present invention include fluoropolymers such as copolymers of ethylene chlorotrifluoroethylene, fluorinated ethylene propylene, as well as those prepared from perfluoronated ∝-fluoroolefin monomers having between 2 and 6 carbon atoms such as hexafluoropropene, perfluorobutene, perfluoroisobutene and the like as well as those prepared from hydrogen containing ∝-fluoroolefins such as trifluoroethylene, vinylidene fluoride, vinyl fluoride, pentafluoropropane and the line and halogen-containing ∝-fluoroolefins such as trifluorochloroethylene, 1,1-difluoro-2,2-dichlorethylene, 1,2-difluoro-1,2-dichloroethylene, trifluorobromoethylene and the like, as well as perfluoroalkoxyethylene polymers.

Ethylene tetrafluoroethylene copolymers preferably employed in the process of the present invention have a melt temperature between about 270° C. and 560° C. and a specific gravity of 1.7. Suitable ethylene tetrafluoroethylene copolymers employed herein are derived from the copolymerization of ethylene with tetrafluoroethylene. The preferred polymeric material has an ethylene-derived content between about 40% and about 70% and a tetrafluoroethylene content between about 30% and about 60% by total polymer weight. Suitable material is commercially available under the tradenames "TEFZEL 210", "TEFZEL 200", and "TEFZEL 280" from I.G. dupont de Nemours, Inc. of Wilmington, Del., the general characteristics of which are defined by the manufacturer and are set forth in Table III.

Suitable polyvinylidine fluoride fluoroplastic materials are derived from the thermal dehalogenation of chlorodifluoroethane. Suitable material is commercially available under the tradename "FORAFLON" and "KYNAR" from Atochem Inc. elf Aquitane Group of Philadelphia, Pa., the characteristics of which are defined by the manufacturer and are set forth in Table II. By way of example, KYNAR 740, KYNAR 10098 (conductive) or (nonconductive) have been found to work effectively as the inner layer, both from the standpoint of processing and performance of the resulting tube.

The material employed in the inner layer of the coextrusion with the thick exterior layer is capable of serving as a barrier to the permeation by an interaction with organic compounds, particularly short chain hydrocarbons. The material of choice will be capable of preventing significant permeation of materials such as the aromatic, aliphatic and alcoholic components of gasoline through to the exterior layer of the multi-layer tubing and, thus, into the surrounding environment. Additionally, the material employed in the inner layer will, preferably, remain essentially non-reactive with the organic compounds conveyed through the multi-layer tubing produced by the process of the present invention.

The thermoplastic material employed in the inner layer generally has a degree of expansion greater than that of the exterior layer. In general, the elongation value of the thermoplastic inner layer is between about 150% and about 250%. The material generally has an elastic memory which can result in the contraction of the material to about 200% of its elongated value upon stretching or other deformative activities.

In order to provide the resulting tubing with the ability to dissipate electrostatic charge, the thermoplastic material of the inner layer may exhibit conductive characteristics. Where conductive characteristics are exhibited, the inner layer is, preferably, capable of dissipating electrostatic charge in the range of between about $10^{-4}$ and about $10^{-9}$ ohm/cm$^2$.

The thermoplastic material employed in the process of the present invention may be inherently conductive in the desired ranges or, preferably, may include in its composition a conductive media in sufficient quantity to permit electrostatic dissipation in the range defined. The conductive media may be any suitable material of a composition and shape capable of effecting static dissipation. The conductive material may be selected from the group consisting of elemental carbon, stainless steel and highly conductive materials such as copper, silver, gold, nickel, silicon, and mixtures thereof. The term "elemental carbon" as used herein is employed to describe and include materials commonly referred to as "carbon black". Carbon black can be present in the from of carbon fibers, powders, spheres, and the like.

The amount of conductive material integrated into the fluoroplastic is generally limited by considerations of low temperature durability and resistance to the degradative effects of the organic material passing through the tubing. Preferably, the fluoroplastic material containing conductive material in an amount sufficient to effect electrostatic dissipation. The maximum amount generally employed in the material is less than about 5% by volume. Electrically conductive materials incorporated into fluoropolymers are described in U.S. Pat. No. 3,473,087 hereby incorporated by reference.

Preferably, the inner layer is extruded at the minimum thickness necessary to permit successful post-extrusion molding operations and to provide a barrier layer in the finished corrugated tube which will prevent the permeation of organic material such as hydrocarbons through the tubing material. It is preferred that the amount of hydrocarbon permeation through the finished multi-layer tubing of the present invention be no greater than 0.5 gm/m$^2$ in a 24 hour interval.

As with the extrusion of the exterior layer, the inner layer is extruded at a thickness sufficient to accommodate localized expansion and elongation of the thermoplastic layers in molded and contoured regions. The contoured regions may evidence or experience a degree of localized stretching or thinning but have sufficient initial thickness on extrusion to withstand the expansion without compromising the integrity of the multi-layer wall structure. In the preferred embodiment, the inner layer is extruded to an initial wall thickness between about 0.15 mm and about 0.25 mm; with a preferred thickness between about 0.18 mm and about 0.22 mm.

In order to achieve effective lamination between the inner and exterior layers, at least one suitable intermediate bonding layer is, preferably, co-extruded between the two layers to achieve a suitable homogeneous bond between the respective layers. The intermediate bonding layer is generally composed of a more elastic thermoplastic material than that employed in the inner and outer layers. Therefore, the intermediate layer is likely to experience differences in expansion and elongation in the post-extrusion molding corrugation process.

In the present invention, the intermediate bonding layer is a chemically dissimilar, permeation resistant, chemical resistant, fuel resistant thermoplastic material which is melt processible in normal ranges of extrusion. By the term "chemically dissimilar", it is meant that the interior bonding layer is, preferably, a non-polyamide material which is capable of integral adhesion with and between the exterior layer and the inner layer as a result of co-extrusion.

The intermediate bonding layer is composed of a thermoplastic material which permits the establishment of a homogeneous bond between the inner and exterior layers. The thermoplastic material also exhibits properties of resistance to permeation of aliphatic, aromatic and alcoholic materials such as those found in fuel. The thermoplastic material employed herein is preferably a melt-processible co-extrudable thermoplastic which will exhibit an affinity to the polymeric material which comprise the exterior layer such as Nylon and the like.

The thermoplastic material co-extruded as the intermediate bonding layer is a melt-processible fluoroplastic selected from the group consisting of polyvinylidine fluoride, polyvinyl fluoride, and mixtures thereof. Suitable polyvinylidine fluoride materials may be derived from the thermal dehalogenation of chlorodifluoroethane. One example of a suitable polyvinylidine fluoride material having a melt processing temperature in the range between 380° F. and 525° F. is commercially available from Atochem elf Aquitane under the tradename ADEFLON 4000.

In a second alternate embodiment, the thermoplastic material co-extruded as the interior bonding layer is a non-fluorinated thermoplastic material selected from the group consisting of thermoplastic polyesters derived from ethylene glycol, co-polymers of substituted or unsubstituted alkenes having less than four carbon atoms and vinyl alcohol, co-polymers of substituted or unsubstituted alkenes having less than four carbon atoms and vinyl acetate, and blends of polyvinyl acetate and urethane.

Suitable ethylene glycol derivatives are selected from the group consisting of polybutylene terepthalate, polyethylene terepthalate, polyteremethylene terepthalate, and mixtures thereof; with polybutylene terepthalate being preferred. One suitable material derived from ethylene glycol is commercially available under the tradename Hüls 1607 ZE40 from Hüls GmBH of Germany. Examples of suitable polyvinyl acetate-urethane blends are disclosed in U.S. Pat. No. 5,112,692 issued May 12, 1992 to Strassel, which is incorporated by reference herein.

Suitable copolymers of ethylene and vinyl acetate have an ethylene content between about 25% and about 40% by weight; while copolymers of ethylene and vinyl alcohol have an ethylene content between about 27% and about 35% by weight; with an ethylene content between about 27% and about 32% being preferred. Examples of suitable ethylene vinyl alcohol materials which can be employed in the tubing of the present invention include ethylene vinyl alcohol commercially available from EVAL Company, Lisle, Illinois, the characteristics of which are set forth in Table IV.

In addition to permitting the establishment of a homogeneous bond between the inner and exterior layers, the intermediate bonding layer may exhibit conductive or static dissipative characteristics such as those described previously. Thus, the intermediate bonding layer may optionally include sufficient amounts of conductive media to effect electrostatic dissipation in the range of $10^{-4}$ to $10^{-9}$ ohm/cm$^2$. As with the inner layer, the intermediate bonding layer may be inherently electrostatically dissipative or may be rendered so by the inclusion of certain conductive materials such as those selected from the group consisting of elemental carbon, stainless steel, copper, silver, gold, nickel, silicon, and mixtures thereof.

As with the extrusion of the inner and outer layers, the intermediate layer is extruded at a thickness sufficient to accommodate localized expansion and elongation in the molded and contoured regions. The contoured regions may evidence or experience a degree of localized stretching or thinning but will have sufficient initial thickness to withstand the expansion without compromising the integrity of the multi-layer wall structure. In the preferred embodiment, the intermediate layer is extruded to an initial wall thickness between about 0.05 mm and about 0.2 mm; with a preferred thickness between about 0.1 mm and about 0.15 mm.

In the method of the present invention, the materials which compose the inner, outer and intermediate layers are extruded in a concentric manner from an extrusion head affixed to a suitable extrusion device (not shown). In the preferred embodiment shown in FIG. 1, the extrusion nozzle has a fixed outer sleeve 14 having an exit outlet for dispensing extruded thermoplastic material and inlet means (not shown) for receiving molten thermoplastic materials. One particular type of extrusion device will be described in greater detail subsequently. The sleeve 14 of the extrusion nozzle defines a thermoplastic conduit through which the respective thermoplastic materials are simultaneously conveyed. The sleeve 14 has a defined inner diameter at its exit outlet which is essentially equivalent to the outer diameter of the finished multi-layer tubing. By "essentially equivalent", it is meant that the inner diameter of the extrusion head sleeve 14 has a diameter between about 60% and about 80% that of the average outer diameter of the finished multi-layer tube with a diameter between about 65% and about 75% being preferred. The term "average outer diameter" as used herein is defined as the diameter of the finished multi-layer tube taken through its non-corrugated regions. In the preferred embodiment, the diameters of the various non-corrugated regions of the tubing produced by the process of the present invention are essentially equal to one another.

A central tip 18 is located within the sleeve 14 adjacent to the sleeve outlet. The tip has an outer end concentrically located in the interior of the sleeve 14. An opposed inner end (not shown) is in connection with suitable adjustment means for modifying and adjusting the concentricity of the orifice so defined.

The material extruded from the extrusion head 14 is tubular and comprises at least three concentrically disposed polymeric thermoplastic layers with at least two of the respective layers being composed of chemically dissimilar materials. The tubular material preferably has an exterior layer, at least one intermediate layer, and an inner layer. The intermediate and inner tubing layers are progressively disposed within the exterior layer in a contacting concentric manner.

At the time of exit from the extrusion head, the tubular material is preferably in a molten state. As used herein, the term "molten" is defined as the state in which the extruded material has set sufficiently to retain its essential tubular shape with the respective co-extruded materials adhering to one another while still retaining sufficient characteristics of deformability to permit cross-sectional expansion of the tube in localized regions in an amount between about 40% and about 60% of the initial cross-sectional area of the tubing upon entry into the mold device. The molten coextruded material also retains longitudinal elongation characteristics which are greater than that of the final material, preferably between about 300% and about 400% greater than the longitudinal elongation characteristics of the finished uncorrugated material. In the process of the present invention it is anticipated that the thermoplastic multi-layer material, upon exiting the extrusion head, will be between about 10% and about 20% set up. Variation in the degree of set up can exist among the various layers of tubing upon exit from the extrusion head.

In the process of the present invention as depicted in FIG. 1, extruded tubular material 20 comprising the concentric layers is introduced into a suitable molding device upon exit from the extrusion head 14. In the preferred embodiment, the extruded tubular material 20 is introduced into the molding device in a molten state which renders it amenable to further processing during the subsequent molding steps of the process. The degree of plasticity remaining in the exterior layer is between about 50% and about 100% greater than the final plasticity for that material. Similarly, the degree of plasticity remaining in the material of the intermediate inner layers are between about 50% and about 100% greater than the final plasticity for those respective materials.

The molding device employed in the process of the present invention, preferably, comprises a plurality of segmented dies 22 each having an upper half and a lower half movably positioned on a suitable reciprocal rotational means such as caterpillar tracks. The respective segmented die halves are positioned in a sequential fashion to form an elongated internal die cavity. Each segmented die set 22, 22' has a first end 24 and a second end 26. When the two halves are brought together a hollow interior shaft defining an essentially cylindrical inner channel which extends from an opening in the first end 24 of the respective die set to an opposed opening in the second end 26 of the particular die set. The individual segmented die sets are sequentially positioned in an end-to-end fashion such that the second end 26 of one die set contacts the first end 24 of the following die set to establish fluid-tight communication through the defined hollow shafts.

Figure 2:
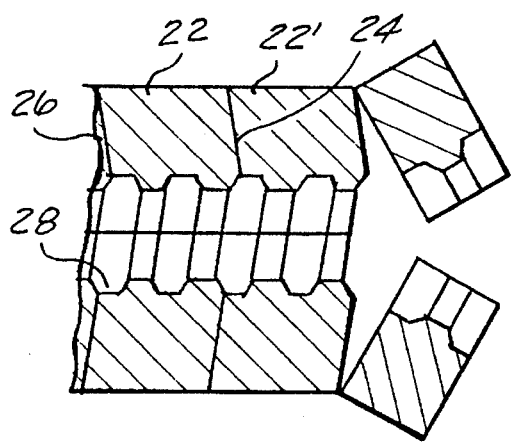
FIG. 2 is a cross section of selected dies employed in the process of the present invention.
Figure 3:
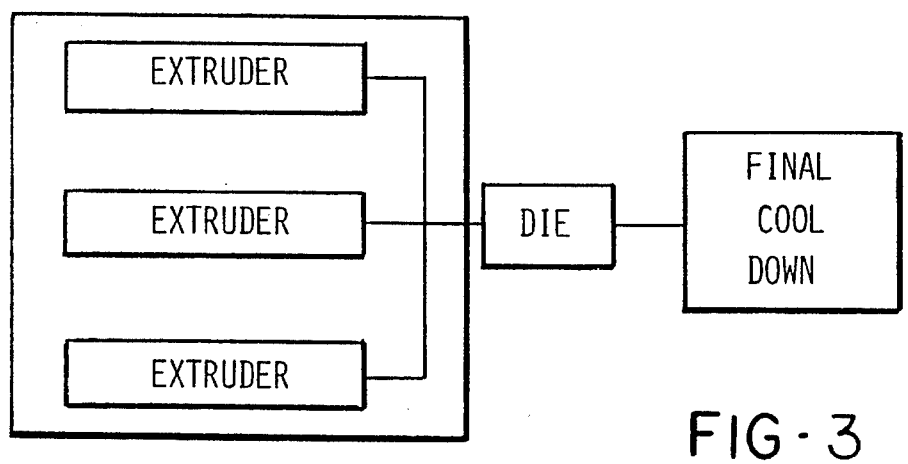
FIG. 3 is a process diagram of the method of the present invention.

As shown in FIG. 2, at least one of the individual segmented die sets 22, 22' has at least one region in the cylindrical channel in which at least one annular depression 28 defined. The annular depression 28 has a geometry which is negative of the longitudinal geometry to be imparted in the finished multi-layer tubing. The annular depressions can be positioned and configured in any desired manner to impart the desired corrugation geometry to the finished multi-layer tubing.

The geometry of the die mold surface may be any suitable configuration which permits the formation of single or multiple ridges, flanges corrugations and the like. The various die sets can be positioned so that the resulting multi-layer tube has a smooth uncorrugated region with regions of corrugations particularly positioned according to the use requirements of the tubing. The resulting multi-layer tubing may also have individual ridges and flanges formed in the tubing body to accommodate end fittings and the like. These are also imparted by suitably configured die sets suitably positioned relative to one another. As depicted in FIG. 1 the die mold surface shown in cross-section has a plurality of essentially curvilinear sinusoidal contoured annular depressions. These will provide a segment of finished multi-layer tubing which would be defined by a region of essentially curvilinear sinusoidal profiled corrugations. FIG. 2 depicts a cross-section of a die mold in which a plurality of essentially square annular depressions are positioned. These will provide a segment of finished multi-layer tubing which would be defined by a region of square profiled corrugations. It is to be understood that the exact geometry of the annular depressions employed in each segmented die can be modified to conform to particular characteristics of the material to be processed and the corrugation characteristics of the finished tubing desired together with any necessary annular flares and the like.

In the process of the present invention, the die sets 22, 22' are positioned on a suitable reciprocal rotational means such as reciprocal caterpillar tracks (not shown) in an end-to-end fashion to form a cylindrical channel having an effective continuous length when operational. Extruded molten unmolded multi-layer tubing material can be introduced into the cylindrical channel. Preferably, the mating upper and lower halves of the die sets 22, 22' are mounted on the reciprocal rotational means so as to travel longitudinally away from the extrusion nozzle 14 at an essentially uniform rate of speed. Once the molding process is completed, the respective individual die halves of each die set 22, 22' are sequentially opened to permit exit of the molded part therefrom. The respective die halves of each die set 22, 22' can be recirculated in an endless fashion to be reunited to mold additional lengths of material in a continuous process. When the die sets 22, 22' are mounted on reciprocal rotation means such as reciprocal catapillar tracks, the two catapillar tracks travel in parallel lateral direction away from the extrusion device. At an appropriate distance away from the extrusion outlet of extrusion sleeve 14 the two rotating tracks part to travel back toward the extrusion outlet point while the finished corrugated multi-layer tubing continues in an essentially lateral direction away from the opened die halves.

When joined, the cylindrical channel defined by the die halves has a minimum inner diameter greater than the outer diameter of the molten tubular multi-layer material that exits the extruder outlet of extrusion device 14. The cylindrical channel defined by the segmented sets which, preferably, has a inner diameter measured in its noncorrugated region of between about 5% and about 20% greater than the inner diameter of the outlet of the extrusion nozzle sleeve 14. Extruded molten multi-layer material exits the extrusion nozzle and is drawn away from the extruder nozzle and into the mold area at a rate sufficient to accommodate the extrusion and molding processes; preferably between about 1 meter per minute and about 10 meters per minute.

Drawing the initial end of the extruded multi-layer material away from the extrusion nozzle can be accomplished by any suitable means such as mechanically threading the initial lengths of extruded material into the initial die positioned on the reciprocal rotational means and/or by drawing an external vacuum on the extruded multi-layer material. Where an initial vacuum is drawn it is preferred that it be between about 10 inches and about 15 inches/Hg. Once an initial portion of the molten tubular multi-layer tubing has been introduced into the cylindrical channel of the mold area and has engaged the inner mold surface, subsequent lengths of extruded unmolded molten tubular multi-layer material will be drawn along by virtue of the engagement between the outer surface of the material and the inner surface of cylindrical channel and lateral movement of the segmented dies.

Once in the mold region, the molten tubular multi-layer material is expanded from its first outer diameter to a second, larger diameter at which the molten tubular multi-layer material engages the hollow cylindrical inner mold surface of the segmented dies which define the mold region. An expansion force is exerted on the molten tubular multi-layer material sufficient to cause the molten material to deformably contact the inner surface of the mold region and force it to conform to the inner surface and to any and all annular depressions located in the mold region.

The expansion force exerted on the molten tubular multi-layer tubing during the molding process can be accomplished by drawing an expansion vacuum on the outer surface of the extruded molten tubular multi-layer material, by pressurizing the interior of the extruded molten tubular multi-layer tubular material during the molding step or by a combination of these two methods. In the preferred embodiment of the process of the present invention, a combination of low expansion vacuum and low pressure are employed to effect expansion of the molten tubular material. In general, expansion vacuum exerted on the extruded tubular multi-layer material does not exceed 15 inches Hg and pressures exerted are under 10 psi. Preferably, expansion vacuum levels are between 10 and 15 inches Hg and air pressure is between 1 and 15 psi.

Vacuum suitable to create the necessary expansion force can be drawn through the mold device by any conventional method known to those skilled in the art. Pressure, is preferably exerted by introduction of a suitable inert gas through a gas introduction port (not shown) preferably located in the tip 18.

The molding time, i.e. the time during which the multi-layer material is held within the mold, is that interval sufficient to permit the extruded tubular multi-layer material to convert from its molten state to an essentially solid form in which it will retain any contours imparted to it during the molding step. This interval varies depending upon the specific composition of the materials which make up the various layers of the multi-layer tubing and the melt processing temperature during extrusion. In general, the molding interval is of sufficient length to permit set up of the slowest setting material. In general molding time is between about 20 seconds and about 40 seconds, with an interval between about 25 seconds and about 35 seconds being preferred.

In the process of the present invention, the multi-layer tubing material is conveyed away from the extrusion nozzle by the action of the movement of the segmented dies during their rotary travel process. The segmented dies travel in a longitudinal direction away from the extruder nozzle at a rate essentially equal to the rate of extrusion of the multi-layer material from the extrusion nozzle. By the term "a rate essentially equal to the rate of extrusion", it is to be understood that the extrusion rate can be equal to the take up rate of the segmented dies or that the two respective rates can be calibrated so that the tubular material experiences a pulling or stretching force.

In the preferred embodiment, the rate of travel is between about 1 m per minute and about 10 m per minute. It is to be understood that, due to the expansion forces exerted on the tubing during the in-line molding process, longitudinal travel at a rate essentially equal to the extrusion rate results in a net linear expansion force being exerted on the tubing during formation. Preferably the linear expansion force defined by the linear extrusion rate and long travel rate is less than 5 psi. Linear expansion results in a total reduction in wall thickness in the individual layers of the multi-layer tubing from the thickness as initially extruded that does not exceed 20% of the initial wall thickness of any given layer as extruded. It is to be anticipated that the individual layers will experience differing reductions in wall thicknesses due to characteristics inherent to their respective compositions as well as the position of each layer relative to the mold surface. It is preferred that multi-layer tubing material produced as a result of the process of the present invention will have a finished wall thickness between about 0.5 mm and about 2.0 mm with a wall thickness between about 0.75 mm and about 1.25 mm being preferred with the exterior layer comprising between 40% and 80% of the wall thickness, the intermediate layer comprising between 5% and 25% of the total wall thickness and the inner layer comprising between 5% and 25% of the total wall thickness.

Once the thermoplastic material has set, the respective die sets can be sequentially opened and the continuous multi-layer tubing can exit from the molding device. The thermoplastic tubing thus formed can be cut to appropriate length upon exit or can be coiled and cut to length at a later time as necessary.

Co-extrusion of the respective tubular layers can be accomplished by various methods and devices. One such co-extrusion which can be effectively employed in the in-line method for producing corrugated multi-layer tubing is the MINI TRI DIE Model 1 device produced by Genco Co. of Clearwater, Fla. Such suitable devices are multiple concentric layer crosshead dies designed for most thermoplastic materials. The MINI TRI DIE Model 1, for example, has a maximum die ID of 0.53 inches and a maximum tip ID of 0.45 inches and has three multiple channel 8-flow helicoids for the inner, middle and outer layers. The MINI TRI DIE device also includes a suitable heater for the head cartridge and a heater for the die.

Other types of extrusion dies can be employed as would be readily ascertainable to those skilled in the art. By way of example, reference is directed to the following generic co-extrusion device in which operation of an extrusion die will now be described. For this example FIG. 4 shows three inlet dies, for the three coextruded layers of the present invention. It is to be understood that in tubing having more than three layers, more inlet dies can be employed.

Figure 6:
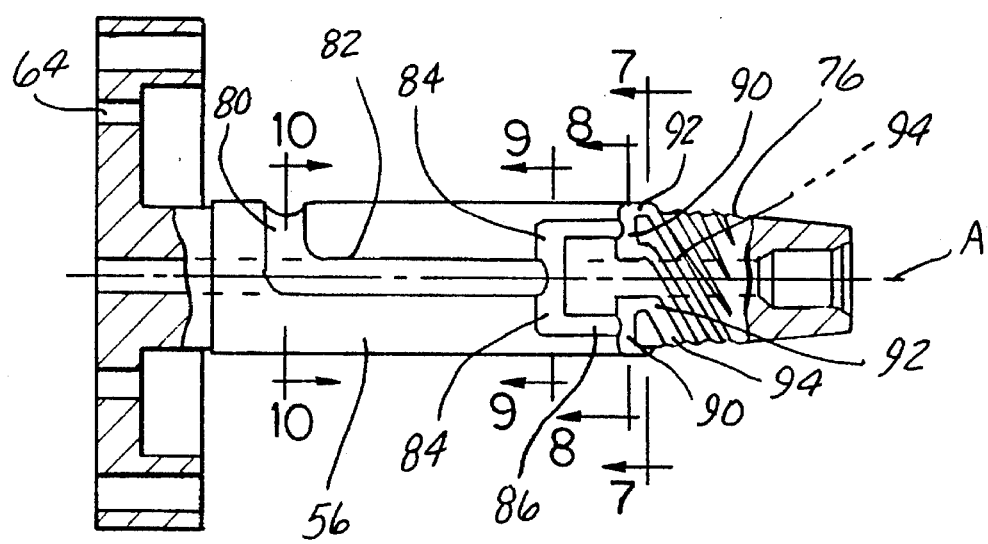
FIG. 6 is a cross sectional view of the interior of the multi-inlet extrusion die taken along the 6—6 line of FIG. 7.
Figure 7:
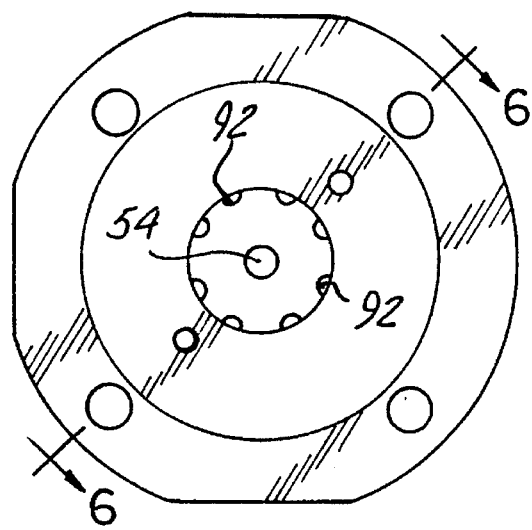
FIG. 7 is a cross sectional view taken along the 7—7 line of FIG. 6.
Figure 8:
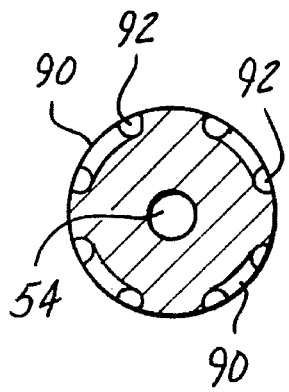
FIG. 8 is a cross sectional view taken along the 8—8 line of FIG. 6.
Figure 9:
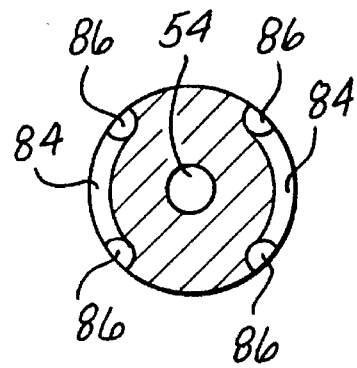
FIG. 9 is a cross sectional view taken along the 9—9 line of FIG. 6.
Figure 10:
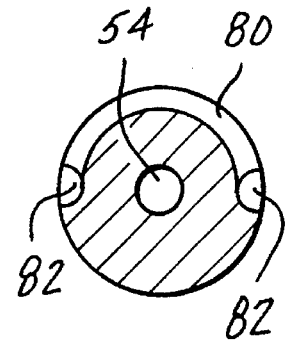
FIG. 10 is a cross sectional view taken along the 10—10 line of FIG. 6.

The die assembly 50 shown in FIG. 4 includes a die housing 52 having an inner die member 56, a center die member 58 and an outer die member 60 as the main structural elements. The die members 56, 58 and 60 are concentric and generally cylindrical shaped extrusion die members. The through bore 54 extends along axis A of the die assembly 50. The die members 56, 58 and 60 are held together by a bolt or pin 62 or the like which extends through the orifice 64. In the embodiment as shown in FIG. 5, the extrusion die members 56, 58 and 60 have inlet 70, 72 and 74, which respectively, extend inwardly from the outer periphery of the die housing 52 to the associated die member. As best shown in FIG. 5, the inlet 70 preferably extends to a semi-circumferential distribution channel 80 through which extrusion material such as the fluorocarbon thermoplastic is passed for distribution to the extrusion end 76 of the die assembly 50. The distribution channel 80 is in fluid communication with a pair of axial distribution channels 82. The axial distribution channels 82 are preferably disposed symmetrically around the inner die member 56 and extend therealong toward the extrusion end 76. Referring now to FIG. 6 and 9, there are shown cross-sections of the inner die member 56 with each axial distribution channel 82 is in fluid communication with a pair of branch distribution channels 84. As illustrated, branch distribution channels 84 extend around the inner die member 56 in a generally semi-circumferential manner. The branch distribution channels 84 are in fluid communication with four axial distribution channels 86. With specific reference to FIG. 6, the axial distribution channels 86 extend along axis A of the inner die member 56 toward the extrusion end 76. The channels 86 are in fluid communication with a plurality of branch distribution channels 90, which extend around the inner die member 56 in a partial circumferential manner, as best shown in FIG. 8. In the preferred embodiment as shown in the Figures, the distribution channels 90 are in fluid communication with eight axial distribution channels 92 which also extend along axis A toward the extrusion end 76. As shown in FIG. 6, the axial distribution channels 92 are in fluid communication with a plurality of generally screw-shaped channels 94.

Thus, the fluoroplastic extrusion material enters the inlet 70 and travels to the inner die member 56. At semi-circumferential distribution channels 80, the extrusion material splits and enters the axial distribution channels 82. The material traveled along the channels 82 and splits again at the branch distribution channels 84. The extrusion material then enters the axial distribution channels 86 and travels to the branch distribution channels 90 where the material splits again and enters the eight axial distribution channels 92. From the channels 92, the extrusion material enters the screw-shaped channels 94. These screw-shaped channels 94 function to provide an even distribution in good uniformity of the extrusion material during the extrusion process.

Referring now to FIGS. 11–15, there are shown various cross-sections of the center die member 58. Extrusion material enters the center die member 58 through the inlet 72. The inlet 72 preferably extends to a semi-circumferential distribution channel 100 through which extrusion material is passed for distribution to the extrusion end 76'. As best described in FIG. 11, the distribution channel 100 is in fluid communication with a pair of axial distribution channels 102. As illustrated, the axial distribution channels 102 are preferably disposed symmetrically around the center die member 58 and extend toward the extrusion end 76'. In the preferred embodiment, each axial distribution channel 102 is in fluid communication with the branch distribution channel 104. The branch distribution channels 104 extend around the center die member 58 in a generally semi-circumferential manner. The channels 104 are in fluid communication with four axial distribution channels 106.

Figure 11:
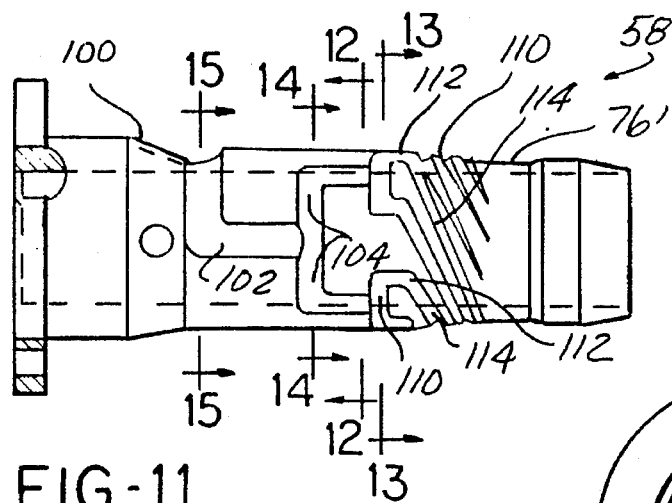
FIG. 11 is a cross sectional view of the center extrusion die that is part of the multi-port extrusion die of FIG. 4.
Figure 12:
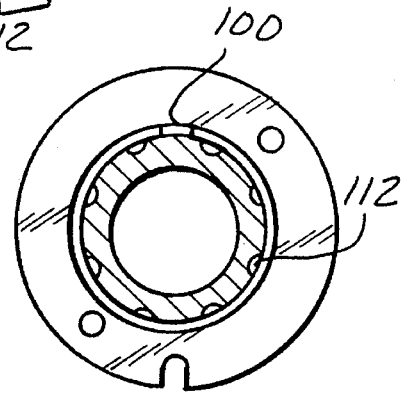
FIG. 12 is a cross sectional view taken along the 12—12 line of FIG. 11.
Figure 13:
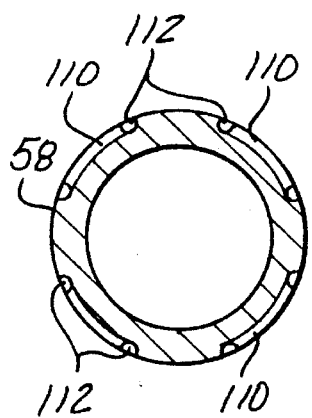
FIG. 13 is a cross sectional view taken along the 13—13 line of FIG. 11.
Figure 14:
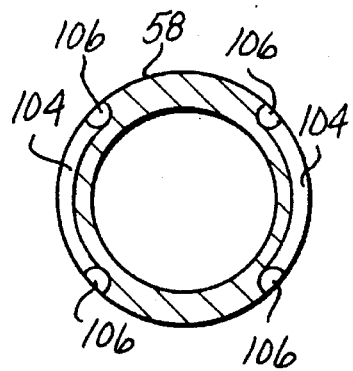
Figure 15:
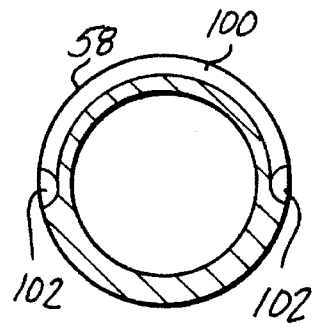
FIG. 15 is a cross sectional view taken along the 15—15 line of FIG. 11.
Figure 16:
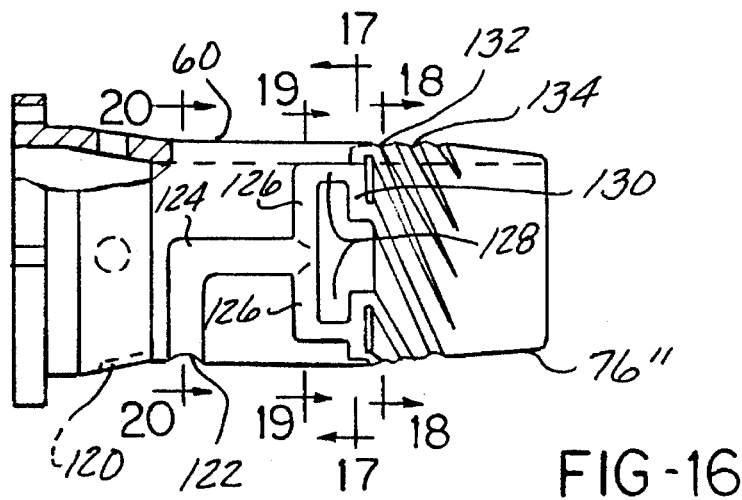
FIG. 16 is a cross sectional view of an outer extrusion die which is a portion of the construction of the multi-inlet coextrusion die of FIG. 4.
Figure 17:
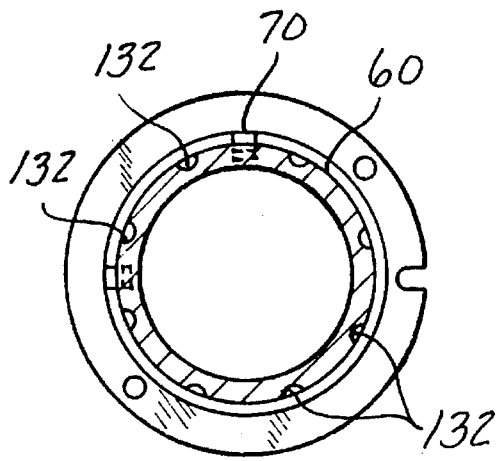
FIG. 17 is a cross sectional view taken along the 17—17 line of FIG. 16.

The axial distribution channels 106 extend along the center die member 58 toward the extrusion end 76'. The channels 106 are in fluid communication with a plurality of branch distribution channels 110 which extend around the center die member 58 in a partial circumferential manner. In this embodiment, the distribution channels 110 are in fluid communication with eight axial distribution channels 112 which also extend along the center die member 58 toward the extrusion end 76'. As shown in FIG. 11, the axial distribution channels 112 are in fluid communication with a plurality of generally screw-shaped channels 114 disposed around the extrusion end 76' in a spiral manner.

In operation, extrusion material enters the inlet 72 and travels to the center die member 58. At semi-circumferential distribution channel 100, the extrusion material splits and enters the axial distribution channels 102. The material travels along the channels 102 and splits again at the branch distribution channels 104. The extrusion material then enters the axial distribution channels 106 and travels therealong to the branch distribution channels 110, where the material splits again and enters the eight axial distribution channels 112. From the distribution channels 112, the extrusion material enters the screw-shaped channels 114. As with the inner die member, the screw-shaped channel 114 function to provide even distribution in good uniformity of the extrusion material during the extrusion process.

Figure 18:
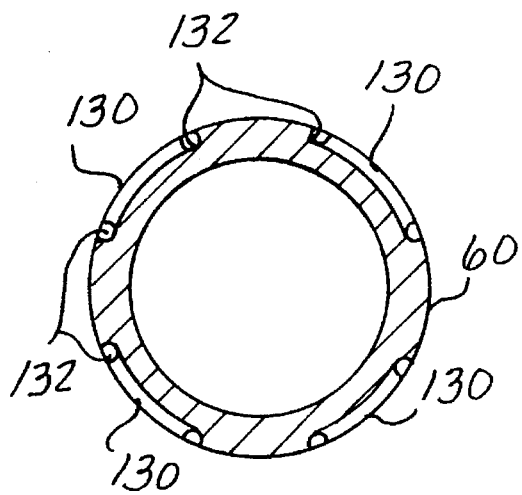
FIG. 18 is a cross sectional view taken along the 18—18 line of FIG. 16.
Figure 19:
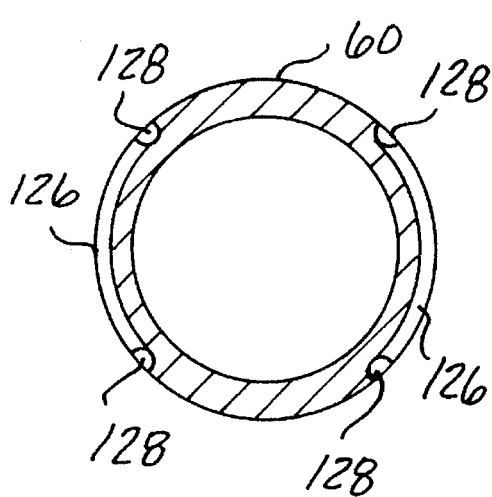
FIG. 19 is a cross sectional view taken along the 19—19 line of FIG. 16.
Figure 20:
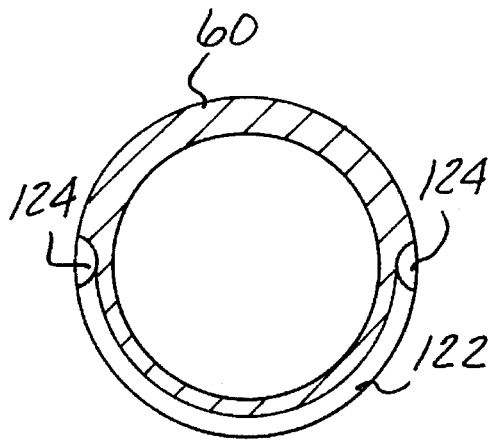
FIG. 20 is a cross sectional view taken along the 20—20 line of FIG. 16.

As shown in FIGS. 4 and 5, fluoroplastic extrusion material enters the outer die member 60 through the inlet 74. Referring to FIGS. 16-20, there is shown various cross-sections of the outer die member 80. The inlet 74 preferably extends to a trough 120 which is connected to a generally semi-circumferential distribution channel 122, through which extrusion material is passed for distribution to the extrusion end 76". The distribution channel 122 is preferably in fluid communication with a pair of axial distribution channels 124. As illustrated, the axial distribution channels 124 are preferably disposed symmetrically around the outer die member 60 and extend therealong toward the extrusion end 76'. In the preferred embodiment, each axial distribution channel 124 is in fluid communication with a branch distribution channel 126. As best shown in FIG. 19, the branch distribution channels 126 extend around the outer die member 60 in a generally semi-circumferential manner. The branch distribution channels 126 are in fluid communication with four axial distribution channels 128. The axial distribution channels 128 extend along the outer die member 60 toward the extrusion end 76". The channels 128 are in fluid communication with a plurality of branch distribution channels 130 which extend around the outer die member 60 in a partial circumferential manner as best shown in FIG. 18. In the preferred embodiment, the distribution channels 130 are in fluid communication with eight axial distribution channels 132. These axial distribution channels extend along the outer die member 60 toward the extrusion end 76". The axial distribution channels 132 are in fluid communication with a plurality of generally screw-shaped channels 134 disposed around the extrusion end 76" in a spiral manner. In operation, extrusion material enters inlet 74 and travels to the outer die member 60. At semi-circumferential distribution channels 122. The material travels along the channels 124 and splits again at branch distribution channels 126. The extrusion material, then enters the axial distribution channels 128 and travels therealong to the branch distribution channels 130 where the material splits again and enters the eight axial distribution channels 132. From the distribution channels 132, the extrusion material enters the screw-shaped channels 134. As with the inner and center die members, the screw-shaped channels 134 therefore function to provide good distribution and uniformity of the extrusion material during the extrusion process.

TABLE I

PROPERTIES OF NYLON-6 MATERIALS

|  | NYCOA 1379 | ALLIED 8350 HS | ALLIED 8350 |
|---|---|---|---|
| Density ($g/cm^3$) | 1.13 | 1.07 | 1.07 |
| Tenisile str. break ($lb/in^2$) | 7 | 8 | 8 |
| Elongation, yield | 300% | 260 | 260 |
| Deflection temp | 340° F. | 140° F. | 140° F. |

TABLE II

PHYSICAL PROPERTIES OF POLYVINYLIDENE FLUORIDE FLUOROPLASTICS

| COMMERCIAL NAME TRADE DESIGNATION | FORAFLON 1000LD | KYNAR 740 | KYNAR 10098 |
|---|---|---|---|
| Melt Point (°C.) |  | 171° C. | 168° C. |
| Density ($lb/ft^3$) | 110 | 109 | 110 |
| Tensile Str. yield | $7.74 \times 10^3$ $lb/in^2$ | $6.50 \times 10^3$ $lb/in^2$ | $4.9 \times 10^3$ |
| Tensile Str. Break | $6.39 \times 10^3$ $lb/in^2$ | $5.40 \times 10^3$ $lb/in^2$ | — |
| Tensile modulus | na | $3.70 \times 10^5$ $lb/in^2$ | — |
| Elongation Break | 300% | 125% | — |
| Hardness (test) | na | D79 (Shore) | — |

TABLE III

PHYSICAL PROPERTIES OF ETHYLENE TETRAFLUOROETHYLENE

| COMMERCIAL NAME | TEFZEL 200 | TEFZEL 210 | TEFZEL 280 |
|---|---|---|---|
| Melt Point (°C.) | °271 | 271 | 271 |
| Density ($lb/ft^3$) | 106 | 106 | 106 |
| Tensile Str. Break ($lb/in^2$) | $6.5 \times 10^3$ | $6.0 \times 10^3$ | $7.5 \times 10^3$ |
| Elongation Break | 200% | 200% | 200% |
| Hardness (Test) | D75(store) | D75(store) | D75(store) |
| Flexural Modulus ($lb/in^2$) | $2.00 \times 10^5$ | $1.70 \times 10^5$ | $2.0 \times 10^5$ |

TABLE IV

| PHYSICAL CHARACTERISTICS OF ETHYLENE VINYL ALCOHOL | | | |
|---|---|---|---|
| COMMERCIAL NAME | EVAL F101 | EVAL 104 | EVA 100 |
| Melt Point | 181° C. | 183° C. | 181° C. |
| Density | 1.19 | 1.19 | 1.19 |
| Tensile Str. Yield (lb/in$^2$) | $1.12 \times 10^4$ | $1.06 \times 10^4$ | $1.17 \times 10^4$ |
| Elongation, Break | 230% | 270% | 130% |
| Hardness | M100 (Rockwell) | M97 (Rockwell) | M101 (Rockwell) |
| % ethylene | 32% | 32% | 32% |

What is claimed is:

1. A method for producing fuel and vapor tubing having at least one region defined by a plurality of outwardly extending annular ridges and corresponding interior convolutions, the method comprising the steps of:

extruding tubular polymeric material from one extrusion head, said tubular polymeric material having at least three concentric layers of thermoplastic material in overlaying bonded relationship to one another, wherein at least two concentric layers are composed of thermoplastic materials having different chemical compositions, said extruded multi-layer tubular polymeric material having a first outer diameter, an inner surface and an opposed exterior surface;

introducing said extruded multi-layer tubular polymeric material into a mold device upon exit of said tubular material from said extrusion head, said mold device comprising means for continuously forming said tubular material introduced therein, said continuous forming means comprising a die unit defining an essentially cylindrical channel mold surface, having a first mold surface inner diameter greater than said first outer diameter of said introduced tubular polymeric material and at least one annular depression positioned therein, said annular depression having a maximum second inner diameter greater than said first inner diameter;

expanding said tubular polymeric material to a second outer diameter such that said exterior surface of said tubular material deformably contacts said inner mold surface of said die unit and said inner surface of said tubular material is deformed to correspond to said annular depression positioned in said mold surface; and permitting said tubular material to exit from said die unit after said expansion step.

2. The method of claim 1 wherein said expansion step comprises drawing a vacuum on said exterior surface of said tubular material during residence of said tubular material in said die unit, said vacuum drawing said tubular material into contact with said inner surface of said die unit.

3. The method of claim 2 wherein the vacuum pressure is between about 10 and about 20 inches Hg.

4. The method of claim 1 wherein said expansion step comprises exerting gaseous pressure on said inner surface of said co-extruded tubular member forcing said tubular material into contact with said inner surface of said die unit.

5. The method of claim 1 wherein said multi-layer tubular material is introduced into contact with said mold means in a molten state in which between about 10% and about 20% of said thermoplastic material has solidified.

6. The method of claim 1 wherein an exterior layer of said tubular material is an extrudable melt processible thermoplastic selected from the group consisting of Nylon 11, Nylon 12, zinc chloride resistant Nylon 6, and mixtures thereof, and at least one inner layer is a fluoroplastic material selected from the group consisting of polyvinylidine fluoride, polyvinyl fluoride, ethylene tetrafluoroethylene and mixtures thereof.

7. The method of claim 6 wherein said exterior layer of said tubular material has a degree of plasticity upon entering said die device between about 50% and 100% greater than a final degree of plasticity upon release from said die unit.

8. The process of claim 1 wherein said expansion step results in cross-sectional expansion of said tubular material in an amount between about 40% and about 60% of said first cross-sectional diameter.

9. The process of claim 1 further comprises longitudinally drawing said tubular material to accomplish elongation of said tubular material to an amount between about 10% and about 20% greater than said initially extruded tubular material.

10. The process of claim 1 further comprising the step of separating molded multi-layer tubing into measured lengths subsequent to exiting the said die after said expansion step.

11. The process of claim 1 wherein said means for continuously forming said tubular material introduced therein comprises:

a plurality of segmented die sets, said die set each comprising:

a) a first member having a first end, an second end opposed to said first end, an upper face disposed between said first end and said second end and a mold surface disposed in and contiguous to said upper face; and b) a second member having a first end, a second end opposed to said first end, an upper face disposed between said first end and said second end and a mold surface disposed in and contiguous to said upper face;

wherein said upper face of said first member and said upper face of said second member are matingly engageable and define an essentially cylindrical shaft when said first member and said second member are placed in mating engagement;

means for maintaining said members of said die sets in end-to-end engagement with one another such that said first end of one member of said die set engages the second end of a contiguous die set;

rotatably moving said first and second members of said die sets relative to one another such that said respective first and second members are matably engaged to define said cylindrical molding channel for an interval during said rotational movement and experience lateral movement during said interval of engagement.

12. The process of claim 11 wherein at least one die set has at least one annular depression located in said essentially cylindrical shaft defined by said first and second members, said annular depression having a second inner diameter greater than said inner diameter of the cylindrical region of said cylindrical shaft.

13. The process of claim 12 further comprising the steps of:

allowing said tubular material to be drawn away from said injection nozzle at a rate essentially equal to said rate of travel of said dies; and sequentially opening said die sets to permit said tubular material to exit therefrom after said tubular material has expanded and deformably contracted said inner surface of said cylindrical channel.

14. The method of claim 13 wherein said expansion step comprises drawing a vacuum on said exterior surface of said multi-layer tubular material during residence of said tubular material in said die unit, said vacuum drawing said exterior surface of said tubular material into contact with said inner surface of said die unit and deforming said inner surface of said tubular material to correspond to contours in said inner surface of said die unit.

15. The method of claim 14 wherein the vacuum pressure is between about 10 and about 20 inches Hg.

16. The method of claim 14 wherein said expansion step comprises exerting gaseous pressure on said inner surface of said co-extruded tubular forcing said exterior surface of said tubular material into contact with said inner surface of said die unit and deforming said inner surface of said tubular material to correspond to contours in said inner surface of said die unit.

17. The method of claim 13 wherein said expansion step comprises exerting gaseous pressure on said inner surface of said co-extruded tubular material forcing said tubular material into contact with said inner surface of said die unit and deforming said inner surface of said tubular material to correspond to contours in said inner surface of said die unit.

18. The method of claim 13 wherein said multi-layer tubular material is introduced into contact with said mold means in a molten state in which between about 10% and about 20% of said thermoplastic material has solidified.

19. A method for producing fuel and vapor tubing having at least one region defined by at least one corrugated region, the method comprising the steps of:

extruding tubular polymeric material from one extrusion head, said tubular polymeric material having at least three concentric layers of thermoplastic material in overlying bonded relationship to one another, wherein at least two concentric layers are composed of thermoplastic materials having different chemical compositions, said extruded multi-layer tubular polymeric material having a first outer diameter, an inner surface, and an opposed exterior surface;

introducing said extruded multi-layer tubular thermoplastic material into a mold device while still in a molten state upon exit of said tubular thermoplastic material from said extrusion head, said mold device comprising:
  a) a plurality of segmented die sets, each die set having a first end, a second end, and an essentially cylindrical shaft extending from said first end to said second end of said die set, said cylindrical shaft defining an inner surface having a first inner diameter greater than said first outer diameter of said introduced multi-layer tubular thermo-plastic material wherein at least one of said die sets has at least one annular depression having a second inner diameter greater than said first inner diameter;
  b) means for sequentially positioning said die sets in an end-to-end fashion such that said first end of an initial die set engages said second end of a subsequent die set at said point said molten tubular material is introduced into said mold device;
  c) means for moving said die sets laterally away from said extrusion head at a uniform rate of travel; and
  d) means for permitting removal of said tubular material from said die sets at a point distal from said extrusion head;

drawing said tubular material away from said extrusion head at a rate essentially equal to movement of said die sets, said drawing step sufficient to effect elongation of said tubular material by an amount between about 10% and about 20% greater elongation of said tubular material as initially extruded;

expanding said tubular material from said first outer diameter to a second outer tubular diameter sufficient to permit deformable contact between said exterior surface of said tubular material and said inner surface of said essentially cylindrical shaft of said segmented dies, wherein said second outer diameter is between about 40% and about 60% greater than said first outer diameter and said inner surface of said tubular material is deformed to correspond to said annular depression positioned in said die set; and sequentially opening said segmented dies to permit said tubular material to exit therefrom, said tubular material having said second tubular outer diameter and convolutions essentially equivalent to said annular depression located in at least one die set, wherein said multi-layer tubing material comprises an exterior layer composed of an extrudable melt processible thermoplastic and at least one inner layer is a fluoroplastic material selected from the group consisting of polyvinylidine fluoride, polyvinyl fluoride, ethylene tetrafluoroethylene and mixtures thereof.

20. The method of claim 19 wherein said expansion step comprises drawing a vacuum on said exterior surface of said tubular material during residence of said tubular material in said mold means, said vacuum drawing said tubular material into contact with said inner surface of said segmented dies and deforming said inner surface of said tubular material to correspond to said annular depression positioned in said die set.

21. The method of claim 20 wherein the vacuum pressure is between about 10 and about 20 inches Hg.

22. The method of claim 19 wherein said expansion step further comprises exerting gaseous pressure on said inner surface of said tubular member forcing said exterior surface of said tubular material into contact with said cylindrical shaft in said die sets;

and wherein said mold device further comprises means for rotationally moving said first half and said second half of said die sets relative to one another said die sets movably articulatable relative one another, said dies being sequentially positioned in an end-to-end fashion and traveling longitudinally away from said co-extrusion head at a uniform rate of travel.

* * * * *

UNITED STATES PATENT AND TRADEMARK OFFICE
CERTIFICATE OF CORRECTION

PATENT NO. : 5,460,771
DATED : October 24, 1995
INVENTOR(S) : Frank L. Mitchell and David L. Noone It is certified that error appears in the above-indentified patent and that said Letters Patent is hereby corrected as shown below:

Column 5, line 11, delete "141" and insert --14--.

Column 18, TABLE III, after "D75", three occurrences, delete "(store)" and insert --(Shore)--.

Column 20, line 27, after "having a first end", delete "an" and insert --a--.

Column 20, line 64, delete "contracted" and insert --contacted--.

Column 21, line 12, after "tubular" insert --material--.

Signed and Sealed this

Twelfth Day of March, 1996

BRUCE LEHMAN

Attest:

Attesting Officer

Commissioner of Patents and Trademarks